United States Patent [19]

Wu

[11] Patent Number: 4,905,408
[45] Date of Patent: Mar. 6, 1990

[54] INSECT SWATTER

[76] Inventor: Chia R. Wu, 2 Fl., No. 2, Lane 75, Chi Mei St., San Chung City, Taipei Hsien, Taiwan

[21] Appl. No.: 323,293

[22] Filed: Mar. 14, 1989

[51] Int. Cl.$^4$ .............................................. A01M 3/02
[52] U.S. Cl. ........................................ 43/137; 43/136
[58] Field of Search .................................. 43/136, 137

[56] References Cited

U.S. PATENT DOCUMENTS

| | | | |
|---|---|---|---|
| 382,580 | 5/1888 | Wilmot | 43/136 |
| 834,039 | 10/1906 | Bailey | 43/136 |
| 1,005,443 | 10/1911 | Luckett | 43/136 |
| 1,861,378 | 5/1932 | Bloodgood | 43/136 |
| 2,911,250 | 11/1959 | Lossius | 43/137 |
| 4,653,222 | 3/1987 | Viscosi | 43/137 |
| 4,787,171 | 11/1988 | Dagenais | 43/137 |
| 4,793,094 | 12/1988 | Weaver | 43/137 |

Primary Examiner—Kurt Rowan
Attorney, Agent, or Firm—Poms, Smith, Lande & Rose

[57] ABSTRACT

An insect swatter including a frame substantially rectangular in shape having a pole which spans through the frame; a porous sticky sheet attached to the frame for adhesively trapping insects; and a handle integrally formed with the pole of the frame. The frame is provided with a number of first protrusions and the pole is provided with a second protrusion. The porous sticky sheet includes two first holes for two corresponding first protrusions to pass through, two second holes for two sides of the corresponding second protrusion to pass through such that the porous sticky sheet does not contact with the table or any other flat surface even when the insect swatter is horizontally placed on it.

6 Claims, 4 Drawing Sheets

INSECT SWATTER

BACKGROUND OF THE INVENTION

The present invention relates generally to insect swatters, and more particularly, to an insect swatter having sticky surfaces for trapping insects by means of flapping the insect swatter directly against the insect.

Heretofore, insecticides have been widely applied to get rid of undesirable insects such as houseflies, mosquitoes, gnats and cockroaches. Most insecticides, nevertheless, represent a further contamination to the atmosphere and also the environment. The use of insecticides is even more undesirable if there are small children in the family. Also, the application of insecticides may destroy the ecological equilibrium of the earth. For years, many efforts have been made to maintain a hygienic and clean environment. However, most insects continue to thrive, especially in tropical and sub-tropical areas. This has been very annoying!

In many cases, the use of insect swatters is inevitable. However, the use of conventional insect swatters is inconvenient due to their unsatisfactory structure.

Conventional insect swatters are generally constructed from a thin sheet connected to a handle. When utilized, it is required to grip the handle and swat the insect against a solid object such as a wall.

Conventional insect swatters suffer from the following drawbacks:

1. The insect swatter deforms due to its single sheet structure after a period of use which causes the results of swatting insects to be unsatisfactory.
2. The body of insect that stains the solid object and therefore creates a cleaning problem.

SUMMARY OF THE INVENTION

It is therefore a primary object of the present invention to provide an insect swatter which mitigates and/or obviates the afore-mentioned drawbacks.

A further object of the present invention is to provide an insect swatter which is convenient to use.

Another object of the present invention is to provide an insect swatter which has sticky surfaces for trapping insects by means of flapping the insect swatter against the target.

Yet another object of the present invention is to provide an insect swatter which adhesively traps the insects in the air without contaminating any solid object with the body of the insect.

These and other objects and advantages of the present invention will become apparent after reading the detailed description provided hereinbelow, with appropriate reference to the accompanying drawings.

DETAILED DESCRIPTION OF THE PREFERRED EMBODIMENT

Figure 1:
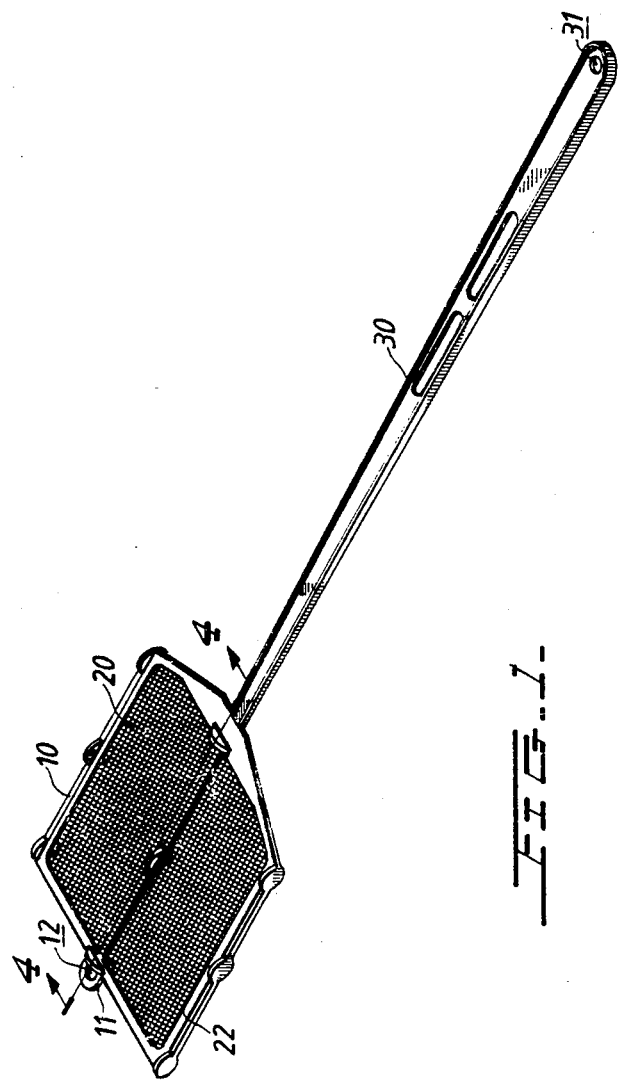
FIG. 1 is a perspective view of an insect swatter in accordance with the present invention.

Referring to the drawings and initially to FIG. 1, it can be seen that an insect swatter in accordance with the present invention comprises a frame 10 and a porous sticky sheet 20. The frame 10 has a lug 11 which is provided with a hole 12 for hanging up the swatter. The frame 10 is attached with the porous sticky sheet 20 for adhesively trapping insects and the like. The frame 10 is integrally formed with a handle 30. The end part of the handle 30 is also provided with a hole 31 for hanging purposes.

Figure 2:
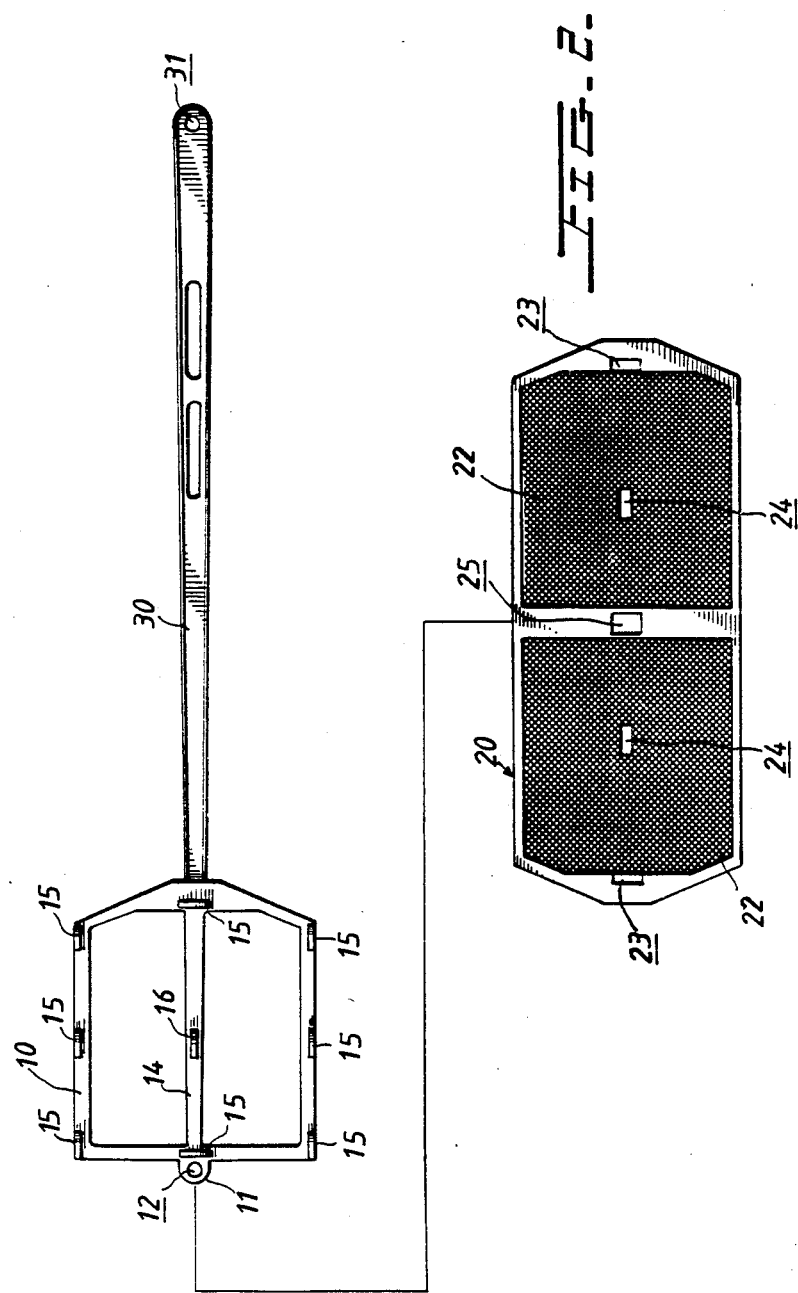
FIG. 2 is an exploded view of the insect swatter of FIG. 1, showing a frame and a porous sticky sheet separately.

Referring next to FIG. 2, it can be seen that the frame 10 is substantially rectangular in shape. The frame 10 includes a pole 14 which spans through the frame 10 and has the handle 30 integrally formed thereon. The frame 10 is provided with a plurality of first protrusions 15 along the periphery thereof to prevent the porous sticky sheet 20 from directly contacting with solid surfaces such as the tables, the walls or the like. The pole 14 is also provided with a second protrusion 16 for the same purpose. It should be noted that both of the first and second protrusions 15 and 16 project from both sides of the frame 10 (see FIG. 4).

Referring again to FIG. 2, it should be understood that the porous sticky sheet 20 especially designed for attaching to the frame 10 is a sheet having two sticky faces. The porous sticky sheet 20 has a shape and size substantially twice the surface area and length defined by the frame 10 in order to adhesively cover both sides of the frame 10. The sticky faces can be categorized as an inner sticky face 21 and an outer sticky face 22.

The inner sticky face 21 is attachable to the frame 10. The inner sticky face 21 thus corresponds to the shape of the frame 10. In other words, the inner sticky face 21 is on the border of the inner face of the porous sticky sheet 20.

The outer sticky face 22 is used to adhesively trap insects. Therefore, the outer sticky face 22 encompasses the whole outer face of the porous sticky sheet 20.

The porous sticky sheet 20 includes two first holes 23 at a periphery thereof for two corresponding first protrusions 15 to pass through, two second holes 24 at a part corresponding to the second protrusion 16 for two sides of the corresponding second protrusion 16 to pass through, and a third hole 25 at a central part thereof for the lug 11 which projects from the frame 10 to pass through.

The porous sticky sheet 20 may be replaced easily with a new sheet after being used for a certain period of time.

Figure 3:
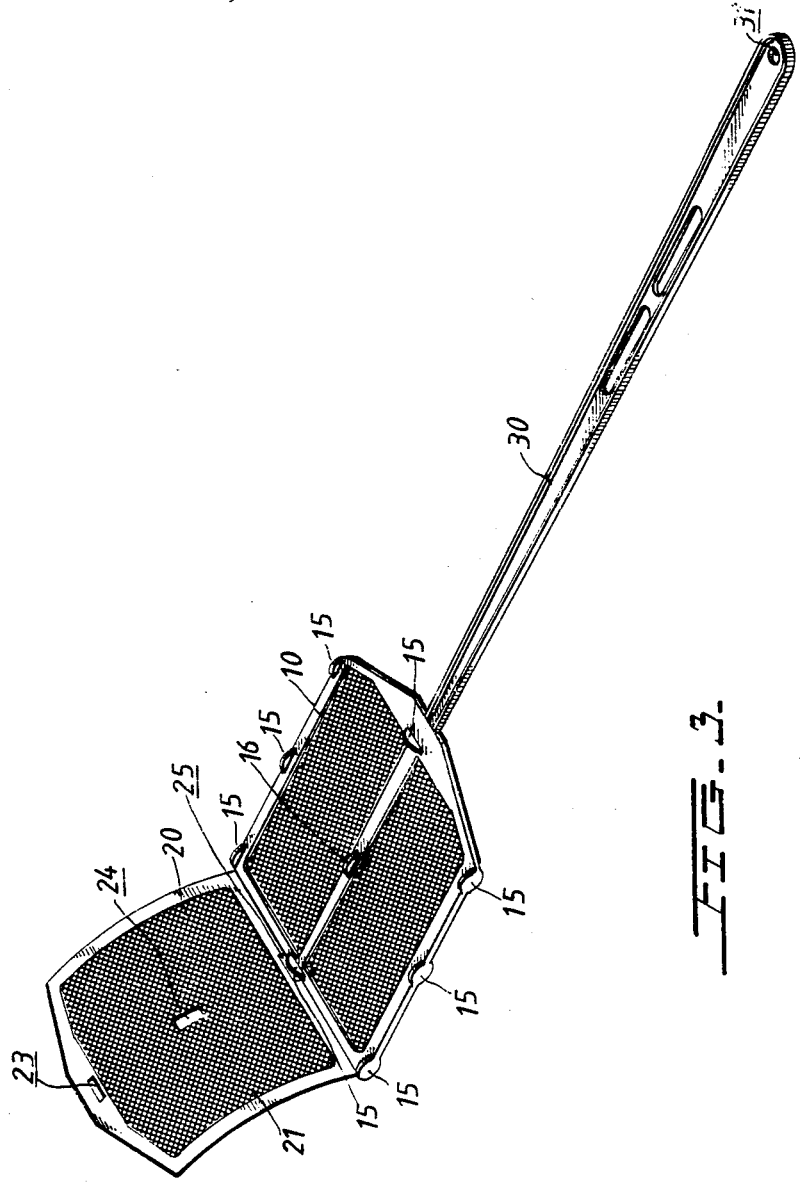
FIG. 3 is a schematic view showing the porous sticky sheet being attached to the frame.

With particular reference to FIG. 3, the way the porous sticky sheet 20 is attached to the frame 10 is depicted. An inner protective layer (not shown) of the inner sticky face 21 is detached therefrom and the inner sticky face 21 of the porous sticky sheet 20 is well arranged such that the first, second and third holes 23, 24 and 25 are respectively in alignment with corresponding first and second protrusions 15, 16 and the lug 11, and then the inner sticky face 21 of the porous sticky sheet 20 is attached to the frame 10. Upon utilization, an outer protective layer (not shown) of the outer sticky face 22 is detached therefrom.

Figure 4:
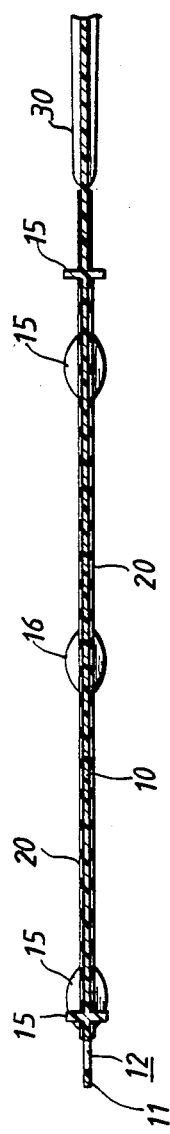
FIG. 4 is a sectional view of the insect swatter taken along line 4—4 of FIG. 1.

Referring next to FIG. 4, it can be seen that the porous sticky sheet 20 does not directly contact with the table or any other flat surface even when the insect swatter is horizontally placed thereon. As previously mentioned, this is due to the formation of the first protrusions 15 and the second protrusions 16.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. An insect swatter comprising:
   a frame substantially rectangular in shape including a pole which spans through said frame, said frame being provided with a plurality of first protrusions provided along a periphery of said frame, said pole being provided with a second protrusion, said first protrusions and second protrusion each projecting from both sides of said frame, said frame having a lug which is provided with a hole;
   a porous sticky sheet attached to said frame for adhesively trapping insects, said porous sticky sheet including two first holes at a periphery thereof for two corresponding first protrusions to pass through, two second holes at a part corresponding to said second protrusion for two sides of the corresponding second protrusion to pass through, and a third hole at central part thereof for receiving said lug which projects from said frame; and
   a handle integrally formed with said pole of said frame.

2. An insect swatter as claimed in claim 1, wherein an end part of said handle is provided with a hole.

3. An insect swatter as claimed in claim 1, wherein said porous sticky sheet is a sheet having an inner sticky face and an outer sticky face.

4. An insect swatter as claimed in claim 3, wherein said inner sticky face is on a border of an inner face of said porous sticky sheet.

5. An insect swatter as claimed in claim 3, wherein said outer sticky face encompasses a whole outer face of said porous sticky sheet.

6. An insect swatter as claimed in claim 3, wherein said porous sticky sheet has a shape and size substantially twice the range defined by said frame.

* * * * *